WELDING APPARATUS AND METHOD OF WELDING
Filed May 29, 1959
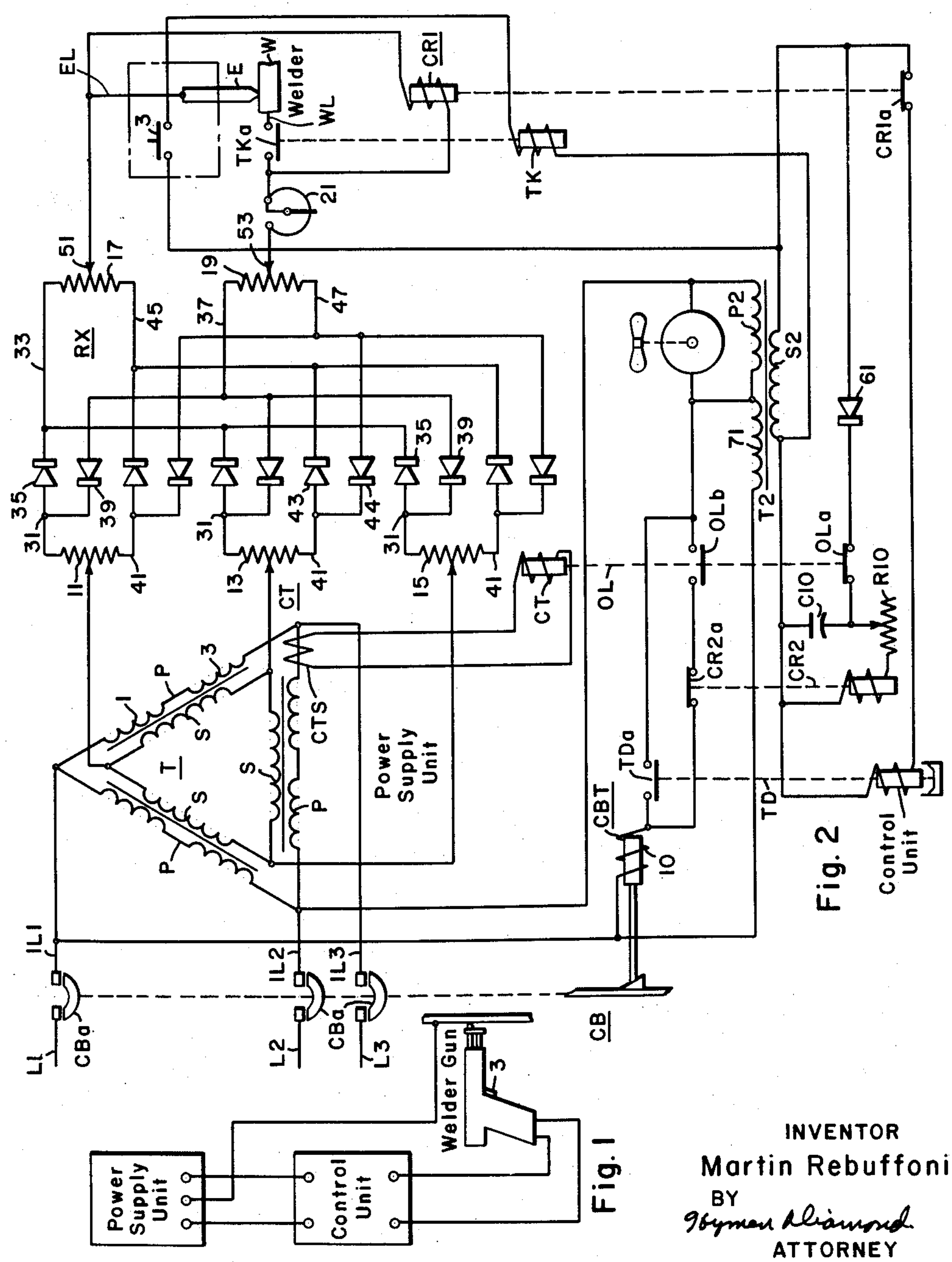
INVENTOR
Martin Rebuffoni
BY
Hyman Diamond
ATTORNEY United States Patent Office 3,018,361
Patented Jan. 23, 1962

1

3,018,361
WELDING APPARATUS AND METHOD OF WELDING

Martin Rebuffoni, Williamsville, N.Y., assignor to Westinghouse Electric Corporation, East Pittsburgh, Pa., a corporation of Pennsylvania
Filed May 29, 1959, Ser. No. 816,782
10 Claims. (Cl. 219—131)

This invention relates to the arc-welding art and has particular relationship to static arc welding apparatus of the direct current type in which rectification is effected by silicon diodes. The expressions "silicon diodes," "silicon-diode rectifiers" or "rectifiers of the silicon-diode type" as used herein means rectifiers composed of silicon or like elements such as germanium which are characterized by low forward resistance and a low ratio of forward to back resistance.

In its specific aspects this invention concerns itself with the welding of studs or like components. A stud is held in a welding gun in contact with the plate to which the stud is to be joined. There is no potential between the stud and the plate until the trigger of the gun is operated. Operation of the trigger simultaneously withdraws the stud from contact and applies power so that an arc is fired and the joint is produced by fusion welding. The stud is in contact with the plate when power is first applied but in normal operation the stud is withdrawn and the arc fired before the current through the stud and plate can reach short-circuit proportions. The current supplied in this operation is substantially higher than the continuous rated current of the power supply apparatus but the current is supplied at a low duty cycle. In a typical operation the welding current may be of the order of 1000 amperes and may be supplied for an interval of one second at intervals of 10 seconds to produce a joint. The duty cycle is then 10%. In another typical situation the welding current is 1500 amperes and the duty cycle is lower than 10%. In attempting to carry out stud welding in this way in accordance with the teachings of the prior art with arc-welding rectifier apparatus of the silicon-diode type it was found that conditions could occur which would tend to cause diode failures.

It is a specific object of this invention to provide rectifier arc-welding apparatus of the type including silicon diodes which shall not suffer from the above described deficiency.

Another object of this invention is to provide rectifier arc-welding apparatus of the silicon-diode type which shall operate reliably without excessive failure of the silicon diodes.

A further object of this invention is to provide a novel arc-welding supply particularly suitable for spot welding operations such as the welding of studs.

A still further object of this invention is to provide a novel method of arc welding with a direct-current power supply of the silicon-diode type which shall not suffer from excessive failures of the diodes.

This invention arises from the discovery that because of the malfunctioning of the apparatus or mal operation by the operator, the supply circuit may be closed while the stud is in metallic contact with the plate and very high short circuit current may flow. Such a condition may arise for example if the operator accidentally pulls the trigger of the gun following the completion of a weld when the stud is joined to the plate. Or the withdrawal of the stud may not be properly coordinated with the application of power and the stud may remain in contact with the plate for an appreciable time so that the current becomes high. The short-circuit current in this case may be as high as 2500 amperes. It has been discovered in arriving at this invention that the high short-

2 circuit current does not damage or destroy the diodes if permitted to flow only for a relatively short time interval of the order of a few periods of the supply. Thus it has been found that for short-circuit current of the order of 2500 amperes the diodes are damaged if the current is permitted to flow for an interval appreciably more than six periods of a 60 cycle supply. This interval is very short compared to the permissible intervals for the normal stud welding current. Twenty-five hundred amperes is between 1⅔ and 2½ times the normal stud welding current which may flow for about a second but if the 2500 amperes is permitted to flow for more than $\frac{1}{10}$ of a second (approximately 6 cycles) the silicon diodes are damaged or destroyed.

In accordance with this invention arc welding apparatus is provided in the operation of which the supply of power is interrupted if the welding current exceeds the non-permissible magnitude for only the few cycles to which it must be limited. Thus in apparatus in accordance with this invention the energization of a stud welding unit is interrupted if current between 2000 and 2500 amperes flows for a time interval of appreciably longer than six periods of the supply.

In accordance with the specific aspects of this invention power supply apparatus of the silicon-diode type is provided which includes circuit interrupting means controlled by two timing mechanisms. One of these mechanisms operates to open the circuit interrupting means and interrupt the supply of power after the current has been supplied during the normal welding time interval if the current flowing through the supply is within the normal range. The other timing mechanism operates to interrupt the welding current if high short-circuit current flows for longer than the few periods to which the apparatus is limited.

This apparatus serves to produce the desired welds at the normal welding current. If a short circuit surge occurs and persists for longer than the permissible few cyles the welding circuit is opened and damage to the diodes is precluded.

The novel features considered characteristic of this invention are disclosed generally above. The invention itself both as to its organization and as to its method of operation together with additional objects and advantages thereof will be understood from the following description of a specific embodiment when read in connection with the accompanying drawing, in which:

FIG. 1 is a diagrammatic view showing a system in which this invention is embodied; and FIG. 2 is a schematic showing a preferred embodiment of this invention.

The apparatus shown in the drawing includes a welder, a power supply unit and a control unit. The subdivision of this apparatus in this way is intended to be on the basis of function rather than structure although in FIG. 1 a structural subdivision is shown. This apparatus is energized from conductors 1L1, 1L2, 1L3 (FIG. 2) which may be connected to the buses L1, L2 and L3 of a power supply of the usual three-phase type through the contacts CB*a* of a circuit breaker CB. The circuit breaker CB also has a trip mechanism CBT which when actuated by the supply of current to its coil 10 opens the contacts CB*a* in an interval of the order of 1 period of a 60 cycle supply after adequate tripping current is initiated. Power for the control unit is derivable from a transformer T2 having a primary P2 and a secondary S2. The primary P2 derives its power from conductors 1L1 and 1L2 and may be connected, usually by jumpers for 220 volts or 440 volts operation.

The welder may be a stud-welding gun as shown in FIG. 1 and includes an electrode conductor EL and a work conductor WL to which the electrode E and work W may be connected. In stud welding apparatus the stud may be connected to the electrode conductor EL and the plate into which the stud is to be joined to the work conductor WL. The electrode and work conductors EL and WL respectively, are usually the output terminals of the power supply unit which are on a terminal board not shown. When the welder is a gun as shown in FIG. 1, the gun includes a trigger 3 which operates to close the circuit or the power supply unit and also to energize a solenoid (not shown) in the barrel of the gun to withdraw the electrode or stud E from the work W.

As shown in the drawing the electrode conductor EL is connected to the negative terminal and the work conductor WL to the positive terminal of supply unit (through TK*a* and resistor 21). The welding then is at straight polarity. The welding may also be carried out at reverse polarity in which the electrode conductor is connected to the negative terminal and the work conductor to the positive terminal. In the usual practice of this invention the work conductor is grounded.

The power supply unit includes a three-phase welding transformer T having a primary P and a secondary S. The primary P preferably has a plurality of pairs of windings 1 and 3 which may be connected in parallel or in series depending on the voltage of the supply. If the supply is of the 440 volt type the pairs are connected in series; if the voltage is of the 220 type the pairs of windings are connected in parallel. In either event the primary windings P are connected in a delta network to the apices of which the conductors 1L1, 1L2 and 1L3 are connected. A Y or zig-zag connection may be used in accordance with the broader aspects of this invention. A current transformer CT is connected between the apex connected to conductor 1L3 and one of the pairs of windings.

The secondary S has a plurality of windings corresponding to the windings of the primary P connected in a delta network. A Y or zig-zag may be used in accordance with the broader aspects of this invention. Two silicon-diode bridges RX are connected to the apices of the secondary S. The bridges and the conductors EL and WL are interconnected through resistors 11, 13, 15, 17, 19, 21. Each apex of the secondary S is connected to the intermediate tap of a corresponding resistor 11, 13, 15 respectively. Each of one set of terminals 31 of the resistors 11, 13, 15 is connected to a positive conductor 33 through a silicon-diode 35 poled to conduct positive current or holes from the resistor to the positive conductor and to a negative conductor 37 through a silicon-diode 39 poled to conduct positive current from the negative conductor to the resistor. Each of the other set of terminals 41 is similarly connected through positive conducting diodes 43 and negative conducting diodes 44 to positive conductor 45 and negative conductor 47. Thus, a silicon diode bridge is supplied from one set of corresponding terminals 31 of the resistors 11, 13, 15 and another silicon-diode bridge is supplied from the other corresponding set of terminals 41 of the resistors.

The positive and negative conductors 33 and 37 and 45 and 47 respectively of the bridges are connected respectively to the terminals of the resistors 17 and 19 each of which has an intermediate terminal 51 and 53 respectively. The intermediate terminal 51 is connected to the conductor WL; the intermediate terminal 53 is connected to the conductor EL through the variable resistor 21 and the contact TK*a* of a contactor TK in the control unit, the operation of which is timed. The contactor TK once actuated remains closed for a time interval which may be set to have a duration of from a few cycles to about a second.

The control unit includes in addition to TK, a relay CR1 having a back contact CR1*a*, a relay CR2 having a back contact CR2*a*, an overload relay OL and a time delay relay TD. The overload relay OL has a back contact OL*a* and a front contact OL*b*. The relay TD has front contact TD*a*. The contact TD*a* closes a predetermined time interval after the coil of the relay TD is supplied with current. In the typical practice of this invention the interval is the order of one second. The relay TD operates to protect the apparatus against damage in the event that the normal welding current inadvertently flows for more than a second.

The actuating mechanism of the timing contactor TK is adapted to be connected across the secondary S2 through the trigger 3. The coil of the relay CR1 is connected between conductor WL and the power (hot) side of contact TK*a*. The relay CR1 is of such construction that it is actuated when the open circuit potential is impressed between conductors EL and WL but drops out for the arc potential between these conductors. The coil of the overload relay OL is supplied from the secondary CTS of current transformer CT.

The coils of relays CR2 and TD are supplied with current from the secondary S2. The coil of the relay CR2 is connected across S2 through a rectifier 61, back contact OL*a* and a variable resistor R10. A capacitor C10 is connected across the coil of CR2 and the resistor R10. The flow of energizing current to the relay CR2 causes the capacitor C10 to be charged through the back contact OL*a*. When the current is interrupted by the opening of OL*a*, the relay CR2 is not immediately deenergized because the capacitor C10 continues to supply energizing current to its coil. The relay CR2 ultimately drops out when the current from the capacitor C10 has decayed to a low magnitude as determined by the resistor R10 and the resistance of the coil. The capacitor C10, the resistor R10 and the resistance of the coil CR2 are in a typical situation so related that once the flow of current to charge the capacitor C10 is interrupted the relay CR2 drops out in an interval of the order of six periods of the supply, that is, approximately .1 second.

The coil of the relay TD is connected across S2 through back contact CR1*a*.

The trip coil 10 of the circuit breaker CB is adapted to be connected across one of the windings 71 of the primary P2 through the front contact TD*a*. Alternately, it is adapted to be connected across the same winding 71 through the back contact CR2*a* and the front contact OL*b*. The circuit breaker CB may then be tripped either if TD is actuated for its timing interval, or if OL remains actuated after C10—R10—CR2 times out.

In the standby condition of the apparatus the circuit breaker CB is closed but the trigger 3 is open. Power is then supplied between the taps 51 and 53 through the transformer T and the rectifier bridges RX but since TK is unactuated, TK*a* is open and there is no power between EL and WL. WL is usually grounded as is the plate or work W. The relay CR1 is actuated and its contacts CR1*a* opens the circuit to the coil of the relay TD. There is no current induced in the secondary of the current transformer CT so that relay OL is deenergized, back contact OL*a* closed and front contact OL*b* open. Current then flows through OL*a* to charge capacitor C10 and actuate relay CR2 so that its back contacts CR2*a* are open. Capacitor C10 is maintained charged by the current which flows through the rectifier 61 and OL*a*.

To produce a stud weld the stud E is touched to the plate W. Then the trigger 3 of the stud gun is pulled actuating TK and closing TK*a* and at the same time withdrawing E from W. Initially the current may be very high and the current induced in the transformer CT may be adequate to actuate the relay OL, OL*a* is then opened interrupting the charging of capacitor C10 and the flow of current to the coil of CR2 but CR2 remains actuated by the discharging current from capacitor C10. Contact OL*b* is closed but since CR2*a* is open the trip-coil 10 remains deenergized. The reduction of potential between conductors WL and EL because load current is flowing causes relay CR1 to drop out. Contact CR1*a* then recloses energizing coil of TD. But contact TD*a* remains open for a predetermined time interval of the order of one second.

If the excessively high current continues to flow for an interval of more than a few cycles, for example six cycles where the current is 2000 to 2500 amperes, the capacitor C10 discharges sufficiently to permit CR2 to drop out, CBT is then actuated through CR2*a* and OL*b* and opens the circuit breaker CB to interrupt the current. If the persistence of the high current is less than the few periods of the supply for which C10—R10—CR2 are set OL drops out reclosing OL*a*, supplying current to the coil of CR2 and recharging the capacitor C10. The circuit including the contacts OL*b* and CR2*a* is then reset to its standby condition. Under such circumstances the relay CR1 remains in its unactuated condition and TD remains actuated. TK is set to time out in an interval such that a sound weld is produced. When TK times out TK*a* opens. CR1 is then actuated opening CR1*a* and resetting TD which has not as yet been actuated. If TK fails to time out properly or if TK*a* sticks or if the circuit including E and W remains closed for any other reason, TD times out closing TD*a*, actuating CBT and operating CB to open the supply circuit. If at any time during the timing out of TK or TD or after the weld is produced the current flowing through EL and WL should rise to the sufficiently high magnitude to actuate the overload relay OL for longer than the few periods for which C10—R10—CR1 is set, CR2 would drop out and the trip mechanism CBT would be actuated to open the circuit breaker thus preventing any damage to the rectifiers RX.

The apparatus which has been disclosed herein is a static-rectifier arc welder in which the direct current is supplied through silicon diodes. The apparatus has general use but is particularly suitable for welding studs. By the operation of the timing mechanisms TK, TD and CR2 the studs may be welded satisfactory while the silicon diodes are protected against damage or destruction by overload during short circuit intervals or by the flow of the normal welding current for an excessively long interval. In practice this apparatus has been found to operate highly satisfactorily.

While a preferred embodiment of this invention has been disclosed herein many modifications thereof are feasible. This invention then is not to be restricted except insofar as is necessitated by the spirit of the prior art.

I claim as my invention:

1. Arc welding apparatus for welding work with a welding electrode comprising power-supply conductors, switch means, rectifier means of the silicon-diode type, means including said switch means connecting said rectifier means to said conductors so that when said switch means is closed power is supplied to said rectifier means by said conductors, means connected to said rectifier means for connecting said rectifier means to said electrode and work for supplying direct current to a welding arc between said electrode and work, first timing means connected to said rectifier means and said switch means and responsive to the welding current between said electrodes and work during the whole interval during which it flows for opening said switch means if welding current of a predetermined first magnitude flows for a predetermined first interval between said electrode and work, said first interval being substantially larger than the interval during which a weld is produced by current of said first magnitude, and second timing means connected to said switch means and responsive to the current flow between said electrode and work for opening said switch means if current of a second magnitude substantially higher than said first magnitude flows through said rectifier means for at least a second interval substantially smaller than said first interval.

2. Power supply apparatus including conductors for supplying alternating current, a circuit interrupter, silicon diode rectifier means, means including said interrupter connecting said conductors to said rectifier means, means connected to said interrupter and to said conductors for opening said interrupter if the current conducted by said rectifier means exceeds a predetermined first magnitude for a first time interval, and means connected to said interrupter and said conductors for opening said interrupter if the current conducted by said rectifier means exceeds a second magnitude substantially smaller than said first magnitude during a second interval of time substantially longer than said first interval.

3. Arc welding apparatus for welding work with a welding electrode comprising power-supply conductors, switch means, rectifier means of the silicon-diode type, means including said switch means connecting said rectifier means to said conductors so that when said switch means is closed power is supplied to said rectifier means by said conductors, means connected to said rectifier means for connecting said rectifier means to said electrode and work for supplying direct current to a welding arc between said electrode and work, first timing means connected to said rectifier means and switch means and responsive to the welding current between said electrode and work during the whole interval during which it flows for opening said switch means if welding current of a predetermined first magnitude flows for a predetermined first interval between said electrode and work, and second timing means connected to said switch means and responsive to the current flow between said electrode and work for opening said switch means if current of a second magnitude substantially higher than said first magnitude flows through said rectifier means for at least a second interval substantially shorter than said first interval, said first magnitude being substantially higher than the continuous current rating of said rectifier means but said rectifier means being capable of conducting current of said first magnitude during said first interval without damage to said rectifier means and current of said first magnitude conducted through said electrode and work during an interval smaller than said first interval being adequate to weld said work, conduction of current of said second magnitude during an interval substantially longer than said second interval damaging said rectifier means.

4. Arc welding apparatus for welding work with a welding electrode comprising power-supply conductors, switch means, rectifier means of the silicon-diode type, means connected to said rectifier means for connecting said switch means, said conductors, said rectifier means and said electrode and work in power supply relationship so that when said switch means is closed direct current is supplied through said rectifying means to a welding arc between said electrode and said work, and first timing means connected to said switch means and responsive to the welding current between said electrode and work during the whole interval during which it flows for opening said switch means if welding current of a predetermined first magnitude flows for a predetermined first interval between said electrode and work, and second timing means connected to said switch means and responsive to the current flow between said electrode and work for opening said switch means if current of a second magnitude substantially higher than said first magnitude flows through said rectifier means for a second interval substantially smaller than said first interval.

5. Power supply apparatus including conductors for supplying alternating current, load conductors, a circuit interrupter, switch means, silicon diode rectifier means, means including said interrupter and said switch means connecting said supplying conductors and said rectifier means in direct current supply relationship with said load conductors when said switch means is closed, means connected to said switch means for closing said switch means for a first time interval and after said interval opening said switch means, means connected to said interrupter and to said conductors for opening said interrupter if the current conducted by said rectifier means exceeds a predetermined first magnitude for a second interval substantially shorter than said first interval, and means connected to said interrupter and said conductors for opening said interrupter if the current conducted by said rectifier means exceeds a second magnitude substantially smaller than said first magnitude during a third interval of time substantially longer than said first interval.

6. Arc welding apparatus for welding work with a welding electrode comprising power-supply conductors, switch means, rectifier means of the silicon diode type, means connected to said rectifier means for connecting said switch means, said conductors, said rectifier means and said electrode and work in power supply relationship with a welding arc between said electrode and work with said switch means closed, first timing means connected to said switch means for maintaining said switch means closed for a predetermined first time interval and thereafter opening said switch means, and second timing means connected to said switch means responsive to the current conducted by said rectifier means for opening said switch means if during said first interval said current exceeds a predetermined magnitude during a second interval substantially shorter than said first interval.

7. Arc welding apparatus for welding work with a welding electrode comprising power-supply conductors, switch means, rectifier means of the silicon diode type, means connected to said rectifier means for connecting said switch means, said conductors, said rectifier means and said electrode and work in power supply relationship with a welding arc between said electrode and work with said switch means closed, first timing means connected to said switch means for maintaining said switch means closed for a predetermined first time interval and thereafter opening said switch means, second timing means connected to said switch means responsive to the current conducted by said rectifier means for opening said switch means if during said first interval said current exceeds a predetermined magnitude during a second interval substantially shorter than said first interval, and third timing means connected to said switch means and responsive to the potential between said electrode and work for opening said switch means if said potential continues to be of the order of the potential across a welding arc for a third interval substantially longer than said first interval.

8. The method of arc welding a stud to work, the welding arc being energized by a power supply of the silicon diode type, the said method comprising engaging said stud with said work, energizing said power supply, disengaging said stud from said work to strike a welding arc, maintaining said supply energized to maintain said arc, interrupting the energization of said supply a first time interval after said supply has been energized if during said first interval the current supplied by said supply to said stud and work exceeds a predetermined first magnitude which would damage the silicon diodes of said supply if conducted for a longer interval than said first interval, and interrupting said supply after a second interval substantially longer than said first interval, if said current during said second interval does not exceed said first magnitude for a sub-interval substantially equal in duration to said first interval, said current having a second magnitude during said second interval such as to weld said stud to said work.

9. Apparatus for arc welding work with a welding eelctrode, comprising a power supply of the silicon-diode type, means connected to said supply for energizing said supply, means connected to said supply for connecting said supply in power supply relationship with said electrode and work to produce a welding arc between said electrode and said work, first timing means connected to said energizing means for interrupting the energization of said power supply a first time interval after said supply has been energized if during this interval the current supplied by said supply to said electrode and work exceeds a predetermined first magnitude which would damage the silicon diodes of said supply if conducted for a substantially longer interval than said first interval, and second timing means connected to said energizing means permitting said supply to remain energized for a second time interval substantially longer than said first interval if during said second interval the current supplied by said supply is at a magnitude smaller than said first magnitude and does not rise to said first magnitude for a sub-interval substantially equal in duration to said first interval, and interrupting the energization of said supply at the end of said second interval, current of said smaller magnitude producing a weld when flowing during said second interval.

10. Apparatus for arc welding work with a welding electrode, comprising a power supply of the silicon-diode type, means connected to said power supply for energizing said power supply, means connected to said supply for connecting said supply in power supply relationship with said electrode and work for striking and maintaining welding arc between said electrode and said work, first timing means connected to said energizing means for interrupting the energization of said supply a first time interval after said supply has been energized if during this interval the current supplied by said supply to said electrode and work exceeds a predetermined first magnitude which would damage the silicon diodes of said supply if conducted for a substantially longer interval than said first interval, second timing means connected to said energizing means for interrupting the energization of said supply after a second time interval substantially longer than said first interval if during said second interval the current supplied by said supply decreases to a magnitude smaller than said first magnitude and does not rise to said first magnitude for a subinterval substantially equal in duration to said first interval, current of said smaller magnitude producing a weld when flowing during said second interval, and third timing means connected to said energizing means for interrupting the energization of said supply at the end of a third interval longer than said second interval in the event that said supply fails to be interrupted at the end of said second interval and said current of said smaller magnitude continues to flow.

References Cited in the file of this patent

UNITED STATES PATENTS

| | | |
|---|---|---|
| 1,975,753 | Delano | Oct. 2, 1934 |
| 2,210,669 | Johnson | Aug. 6, 1940 |
| 2,299,941 | Townsend | Oct. 27, 1942 |
| 2,465,794 | Fereday | Mar. 29, 1949 |
| 2,530,749 | Yordeny | Nov. 21, 1950 |
| 2,710,951 | Staples | June 14, 1955 |
| 2,812,513 | Breggin | Nov. 5, 1957 |